(12) United States Patent
Jongsma et al.

(10) Patent No.: US 10,371,791 B2
(45) Date of Patent: Aug. 6, 2019

(54) UNDERWATER POSITIONING SYSTEM

(71) Applicant: Fugro N.V., Leidschendam (NL)

(72) Inventors: Arnoud Marc Jongsma, Leidschendam (NL); Carl Sonnier, Lafayette, LA (US)

(73) Assignee: Fugro N.V. (NL)

( * ) Notice: Subject to any disclaimer, the term of this patent is extended or adjusted under 35 U.S.C. 154(b) by 60 days.

(21) Appl. No.: 15/522,836

(22) PCT Filed: Nov. 2, 2015

(86) PCT No.: PCT/NL2015/050764
§ 371 (c)(1),
(2) Date: Apr. 28, 2017

(87) PCT Pub. No.: WO2016/068715
PCT Pub. Date: May 6, 2016

(65) Prior Publication Data
US 2017/0328982 A1 Nov. 16, 2017

(30) Foreign Application Priority Data

Oct. 31, 2014 (NL) ...................................... 2013724

(51) Int. Cl.
*B63C 7/26* (2006.01)
*G01S 1/70* (2006.01)
(Continued)

(52) U.S. Cl.
CPC .................. *G01S 5/16* (2013.01); *B63C 7/26* (2013.01); *G01S 1/70* (2013.01); *G05D 1/0692* (2013.01)

(58) Field of Classification Search
CPC .... G01S 5/16; G01S 1/70; B63C 7/26; G05D 1/0692
See application file for complete search history.

(56) References Cited

U.S. PATENT DOCUMENTS 4,981,353 A * 1/1991 Murakawa ............... G01C 3/10
356/141.1
7,025,014 B1 4/2006 Forgach et al.
(Continued)

FOREIGN PATENT DOCUMENTS

EP        1983397 A2    10/2008
JP        2005193854 A *  7/2005
WO    WO-2004088351 A1 * 10/2004 ............. B63G 8/001

OTHER PUBLICATIONS

International Search Report and Written Opinion; PCT Application No. PCT/NL2015/050764; dated Feb. 26, 2016.
(Continued)

*Primary Examiner* — Aaron L Troost
(74) *Attorney, Agent, or Firm* — Polsinelli PC

(57) ABSTRACT

An underwater positioning system provides position information for a rover, moveable within a reference frame. The system may comprise: at least one beacon having a light source, located at a fixed position within the reference frame; an underwater imaging device, moveable with the rover in the reference frame to observe the light source from different viewpoints and determine direction data representing a direction or change in direction of the light source with respect to the imaging device; an orientation sensor, associated with the imaging device to determine an orientation of the imaging device with respect to the reference frame and generate orientation data; and a scaling element for providing scaling data representative of a distance between the imaging device and the light source. Various different beacons may be provided.
In alternative system implementations, the locations of light source(s) and underwater imaging device are reversed between rover and beacon(s).

24 Claims, 8 Drawing Sheets

(51) Int. Cl.
*G01S 5/16* (2006.01)
*G05D 1/06* (2006.01)

(56) References Cited

U.S. PATENT DOCUMENTS

| | | |
|---|---|---|
| 8,047,149 B1 | 11/2011 | Antonelli et al. |
| 2002/0040783 A1* | 4/2002 | Zimmerman .......... B63G 8/001 166/366 |
| 2014/0198206 A1 | 7/2014 | Murray |

OTHER PUBLICATIONS

Wang, Howard H. et al.; "Experiments in Automatic Retrieval of Underwater Objects Wit an AUV", Oceans '95. MTS/IEE. Challenges of Our Chaning Global Environment; San Diego, CA, USA Oct. 9-12, 1995, New York, NY, USA, IEE, US, vol. 1, Oct. 9, 1995 (Oct. 9, 1995), pp. 366-373, XP010197404.
IMCA; "Guidance on Subsea Metrology," IMCA S 019; Feb. 2012; International Marine Contractors Association; www.imca-int.com.

* cited by examiner

UNDERWATER POSITIONING SYSTEM

CROSS-REFERENCE TO RELATED APPLICATIONS

This application is a national stage entry of PCT/NL2015/050764 filed Nov. 2, 2015, which claims priority to Netherlands Application No. 2013724, filed Oct. 31, 2014, said application is expressly incorporated herein in its entirety.

TECHNICAL FIELD

The present invention relates to systems and methods for positioning in an underwater environment and more particularly to a system of beacons for such use. The invention also relates to a subsea metrology system for determining the relative positions and orientations of two objects.

BACKGROUND ART

During subsea operations, it is frequently necessary to accurately identify the position and or orientation of an object, either in absolute terms or relative to another object. Such objects may include oil pipelines and flanges, engineering structures, geological structures, salvage items and the like. Presently, much of the work in this context takes place using remotely operated vehicles (ROVs). Nevertheless, it will be understood that similar issues apply in the case of human divers, manned submarine devices and unmanned Autonomous Underwater Vehicles (AUV's) and the invention is equally applicable to all underwater rovers.

In general, for a rover, precise absolute positioning underwater in a global reference frame is difficult, since satellite positioning systems are ineffective underwater. Unaided Inertial Navigation systems (INS) using gyroscopes and accelerometers can provide reliable coarse positioning but are subject to drift. For metrology purposes, such systems do not reliably achieve the required centimeter level relative accuracy over the period of time required to travel from a first object to a second object, without additional measures being taken. Acoustic positioning systems are effective underwater, but have disadvantages depending on the type of system and the water depth:

- For USBL (Ultra Short Baseline) systems fitted on the surface vessel, the positioning accuracy of the rover degrades with increasing water depth;
- LBL (Long Baseline) arrays of transponders on the seabed are expensive and further require costly deployment and calibration of the array;
- Acoustic DVL (Doppler Velocity Log) aided INS positioning increases INS accuracy but nevertheless will exhibit drift;
- Acoustic noise from the ROV or other sensors and multipath effects can affect the accuracy and reliability of acoustic positioning systems.

Relative positioning is also difficult e.g. where it is desired to determine the position of a first object with respect to a second object. If the optical visibility is such that both objects are visible from a given location of the rover, it may be possible to perform optical or laser range-finding of the respective objects. Propagation of light underwater has, however, serious limitations compared to propagation in air or free space and only green to blue light can propagate a substantial distance (10's to 100's of meters) without being attenuated beyond practical use. In most situations, both objects will not be adequately visible from the same position and displacing the rover from a first position to a second position requires knowledge of the relevant displacement. Since both observations are not simultaneous, the relevant time of observation must also be taken into account One method of underwater metrology uses cameras mounted on an ROV to take sequences of photographs from different locations. By combining the photographs using principles of triangulation, the relative positions of the surveyed objects can be determined. This procedure is known from photogrammetry and requires relatively good visibility and significant processing power. Light sources on the ROV are required when the scene is dark. This in turn further reduces visibility due to backscattering. Markings may be provided on the surveyed objects in order to improve accuracy and scaling bars are used to provide baseline measurements. Document GB2257250 describes the use of photogrammetry for underwater surveying. A further device is described in WO2011143622, which captures panoramic images underwater.

It would be desirable to provide an alternative system and method that provides additional position data, in particular as an additional redundancy to existing systems. It would be further desirable to provide a system capable of operating even in reduced visibility conditions and that efficiently uses processor capacity.

SUMMARY OF INVENTION

According to a first aspect of the invention, there is provided an underwater positioning system for providing position information for a rover, moveable within a reference frame, the system comprising: at least one beacon having a light source, located at a fixed position within the reference frame; an underwater imaging device, moveable with the rover in the reference frame to observe the light source from different viewpoints and determine direction data representing a direction or change in direction of the light source with respect to the imaging device; an orientation sensor, associated with the imaging device to determine an orientation of the imaging device with respect to the reference frame and generate orientation data; and a scaling element for providing scaling data representative of a distance between the imaging device and the light source.

By using a light source, i.e. an active light source as a beacon, high levels of accuracy may be achieved over considerable distances, even in cases of turbidity or low visibility. In the case of conventional procedures using cameras to locate objects or identify markers, the reflected light received by the camera will have traveled twice the distance compared to that emanating from an active light source at the same position. Additionally, illumination of the object or marker leads to backscattering of light making image processing more complex. In the case of point light sources observation can take place in an otherwise dark environment. Even at distances where the light source becomes blurred or hazy, signal processing can accurately identify the center of the light source. As discussed above, conventional systems have used acoustic beacons for subsea positioning. Long baseline (LBL) acoustic metrology operates primarily to determine a distance dimension between beacons in an array. Nevertheless, accuracies depend on assumptions and measurements relating to the local speed of sound and such devices can be sensitive to subsea noise. In general, distance accuracies may be limited to around 5 cm, increasing with distance from the transponder. In the case of photogrammetric measurement of the angles between point light sources, accuracies of better than 0.05 degrees may be achievable. This may equate to less than 1 millimeter error per meter distance.

In the present context, reference to an "imaging device" is intended to refer to any device capable of registering the location of the light source within an image field and determining its direction relative to the imaging device. In one embodiment, the imaging device may be capable of measuring and evaluating the angle between two point light sources. In general, such imaging devices are well known and available off-the-shelf as photogrammetry devices, survey cameras, 360-degree imaging cameras and the like. These devices may provide simultaneous images of the relevant points whereby the distance between the images and the geometry/focal length of the imaging device determine the angular spacing. Nevertheless, the imaging device need not have full imaging potential and could be purpose built for sequentially locating point light sources and determining their angular displacement in the manner of a theodolite. Preferably, the imaging device is accurate to less than 0.05 degrees.

The orientation sensor may be any device capable of determining the orientation of the imaging device with respect to the reference frame. The expression "X associated with Y" is generally intended to mean that object X is at a fixed position with respect to object Y and moves together with it. Thus, the phrase "orientation sensor associated with the imaging device" is intended to mean that the orientation sensor is at a fixed position with respect to the imaging device and moves together with it. Pitch, roll and heading sensors of various types are known that are capable of determining the momentary orientation of an object in 3-D space. These may be magnetic and gravity based systems using active or solid state technology. In one embodiment, the orientation sensor may be a MEMS type pitch and roll sensor, preferably with static accuracy of 0.1 degrees and a dynamic accuracy of 0.25 degrees or better.

The proposed principles may be implemented in underwater positioning systems configured for providing absolute positioning information for a rover with respect to a fixed reference frame. In such embodiments, beacons with light sources may be deployed at fixed positions with respect to the fixed reference frame e.g. on the seabed and/or in/on objects that are assumed to remain stationary with respect to the seabed. In alternative implementations, underwater positioning systems may be configured for providing relative positioning information for a rover with respect to a dynamic reference frame. A dynamic reference frame may for example be associated with another rover or leader vehicle that is provided with at least one beacon light source, and which is moveable underwater. In such embodiments, the leader vehicle or rover may function as a moveable beacon with one or more light sources that define the dynamic reference frame (for which the position and orientation may dynamically change with respect to the fixed reference frame), and at least one rover may use its associated underwater imaging device to observe the light source(s) from different viewpoints and determine direction data representing a direction or change in direction of the light source(s).

According to a preferred embodiment of the invention, the light source is an LED. Such devices may be cost effective and disposable, while being suited for subsea conditions. Preferably, the LED is a point light source, ensuring accurate identification of the center point even at the limits of visibility. In a further embodiment, the light source is an LED that is adapted for emitting light with wavelengths substantially in a range of 420 nanometers to 520 nanometers and an intensity maximum in the range of 460 nanometers to 480 nanometers. For subsea operation, green or blue LEDs are preferred as these are least attenuated. In an alternative arrangement, more than one LED may be located on a single beacon, allowing for a short baseline to be identified.

As will be understood, observation of a light source can provide angular displacement information but cannot provide scale information. For this reason, at least one scaling element must be present in order to provide at least a single length dimension. As will be understood, the characteristic length of the scaling element should be as large as possible in the context of the reference frame, to reduce negative effects of observation errors.

In one embodiment of the invention, the scaling element may comprise a pair of light sources mounted a predetermined distance apart. This may be in the form of a calibrated bar, rod or pipe having a light source at each end. Alternatively, a plurality of light sources could be located at predetermined intervals along an elongate strip, which could be rigid or flexible. Scaling may also be achieved in an alternative embodiment by providing a stereo imaging device or the like. As will be understood, the length of the scaling element should be as long as possible in the context of the reference frame.

In an alternative arrangement, the scaling element may comprise an acoustic transponder located at a known position in or on the beacon with respect to the light source and a corresponding acoustic transceiver associated with the imaging device. By appropriate triangulation between the respective light sources and with the addition of a single distance measurement from one light source to the imaging device, the overall scale of the reference frame can be determined. For this purpose, the accuracy of the acoustically measured distance needs to be adequate for the desired position accuracy within the reference frame. In one embodiment, the acoustic beacon may be located and focused such that the emitted sound appears to have come from the same point as the light source. Alternatively, the acoustic beacon may be located adjacent to the light source with a known offset. Most preferably, the acoustic beacon is located vertically below the light source. A solution other than vertical might require additional attitude capability to determine the offset direction. Furthermore, the term "associated with" is intended to mean that the receiver is at a fixed position with respect to the imaging device and moves together with that device. As will be discussed below, in the case of an ROV, both the imaging device and the acoustic receiver will be mounted on the ROV with predetermined offsets from each other. Most preferably, the imaging device and the acoustic receiver would form part of the same module aboard the ROV.

According to another embodiment of the invention, the system further comprises an Inertial Navigation System (INS) associated and moveable together with the imaging device. INS's are generally conventional devices, used to provide relative and absolute local orientation and position information. Reference to an INS is not intended to be restrictive on any particular principle of operation and should include any motion sensor capable of determining changes in 3D position. In particular, the INS may be based on mechanical gyroscopic action, fiber optic gyroscopes (FOG), laser ring gyroscopes (LRG), MEMS based technologies, accelerometers, magnetometers or any combination of the above. Most preferably, the INS is "north-seeking" in that it comprises a heading indicator allowing momentary determination of its attitude with respect to the earth, in particular, geodetic or magnetic north. Additionally, the INS should preferably be an aided INS, in that it is provided with additional inputs to improve the INS accuracy. This may include hydro acoustic positioning, a depth sensor providing an absolute depth measurement and/or a verticality sensor, providing orientation with respect to the earth's gravitational field and the USBL, SBL and DVL systems mentioned above. These additional sensors may be part of the INS or associated therewith as part of an integrated aided INS solution. In the case that the imaging device is located on an ROV, the INS may be that of the ROV. This will in general be sufficient to provide rough information to the imaging device, sufficient for it to distinguish between light sources. For a reference frame in which the light sources are spaced by distances of around 30 meters, meter or lower absolute accuracy of the INS may be sufficient. Preferably, the INS is arranged to provide absolute positional information and in co-operation with the imaging device can also determine the locations of the light sources in the absolute (e.g. global) reference frame.

In a more preferred embodiment, the INS has relative accuracy to better than 5 cm, more preferably better than 1 cm in the X-Y directions and is accurately calibrated to the imaging device. In this case, the INS may be used as the scaling element to determine at least a linear distance between a first viewpoint and a second viewpoint. By moving the imaging device along a base line of known length, ambiguities relating to scale can be resolved for the reference frame of the light source. Conventional procedures for improving accuracy, including drift compensation and repetition of measurement may be used to enhance these results. Although, for determining the scale of the reference frame, a linear distance between the first and second viewpoints may be sufficient, preferably the INS is arranged to determine the 3D vector from the first to the second viewpoints. In this manner, the relative orientation of the reference frame may be easily determined. Ideally, photogrammetric angular measurements are processed together with INS and other available observational data in a single navigation engine, which enables continuous update of the scale. As an alternative to the use of an INS to determine the scale by moving the imaging device from a first viewpoint to a second viewpoint, first and second distinct imaging devices may be used, located a calibrated distance apart in a short baseline configuration. The calibrated distance apart may then serve as the scaling element.

In another embodiment, the scaling element may comprise a depth sensor associated with the imaging device and capable of resolving changes in depth thereof. In this manner, movement in the Z direction between a first viewpoint and a second viewpoint may be determined and used alone or together with other data to evaluate the scaling data.

Although the above discussed scaling elements may each be used independently, most preferably, the system is provided with a number of alternative scaling elements that work together to improve accuracy and provide fault tolerance. Thus, the INS may be used for initially and roughly determining the positions at which the one or more light sources should be dropped. It can also be used for maintaining accuracy or resolving ambiguities at locations where insufficient light sources are visible or in conditions where visibility becomes poor. Acoustic transponders may help resolve ambiguities when the determined angles give poor accuracy.

Where multiple devices work together to achieve the required accuracy, careful time stamping of data is required. Most preferably the system comprises a clock arranged to time stamp the scaling data relative to the direction data. It will also be understood that determining the direction data may already require time stamping of the orientation data relative to the image produced by the imaging device. In this manner, the momentary orientation of the image perceived by the imaging device can be evaluated based on the combination of the INS data and the imaging data. The data should preferably be time stamped to an accuracy of at least 1 millisecond. Most preferably, the time stamp will be accurate to around 0.1 millisecond. The required timing accuracy, including unaccounted processing and communication latencies, may depend on the required measurement precision and the expected movement rate of the imaging device.

The system preferably comprises a processor arranged to receive and analyze the direction data and the scaling data to determine the position information. In one embodiment, the processor is local to the imaging device and may be integrated therewith. The processor may thus be located subsea e.g. on the rover, thereby eliminating the need for signal transmission to the surface. Transmission to the surface may be limited to resultant processed data or alternatively data may be logged and delivered to the surface for processing on return of the imaging device and processor e.g. in the case of AUVs.

It will be understood that a single light source may provide considerable added information to an existing system. According to a further embodiment of the invention, the system may comprise a plurality of beacons, each having at least one light source forming a beacon matrix or network. Additional beacons will further improve the redundancy and accuracy of the system and different techniques may be used to take advantage of them. In particular, standard Simultaneous Localization and Positioning (SLAM) processes may be applied to resolve the matrix. In one embodiment, the beacons may be located randomly in the vicinity of an object to be surveyed to form a beacon matrix. The matrix may have scale and dimension according to the task at hand but for subsea operations around an engineering installation the matrix may typically have a maximum dimension of between 50 meters and 5 kilometers. It will however be understood that there is no limit to the number of beacons that may be installed and theoretically such beacons could plot the route of a pipeline over many kilometers. Under turbid conditions, the matrix may require individual beacons to be close together but in clear water, each beacon may be set at a maximum visible distance from its neighbor. Depending on the strength of the light source, each beacon may be located more than 50 meters from its neighbor, more preferably more than 100 meters from its neighbor and even more than 200 meters apart. Where greater local accuracy is required and where there is a requirement to see a number of light sources simultaneously from a given location of the rover, the beacons may be located closer together. It is understood that the brightness of the beacon light required may vary from a few lumens to over a thousand depending on the distances involved and water clarity.

In one embodiment, the imaging device may comprise a single camera pointing forwards and having an appropriate field of vision for the task at hand. In alternative embodiments, the imaging device may comprise one or more cameras arranged to capture direction data within a horizontal field of vision of at least 90°, preferably at least 180° and more preferably over 360°. Increasing the field of vision allows the imaging device to identify numerous light sources simultaneously. It will be understood that the accuracy of resolution of angles between the light sources within a single image may be better than that achieved when the imaging device itself must pan or the rover change direction. In an alternative embodiment, the imaging device may comprise a camera pointing downwards e.g. for viewing a matrix of beacons from above and performing SLAM techniques or photogrammetric techniques.

Once the reference frame has been established, the position and attitude of the first subsea object with respect to the reference frame can be determined. This may be achieved by various conventional procedures. According to one preferred embodiment, the system may comprise a laser striping and imaging device associated and movable together with the imaging device for generating a 3D profile of objects within the reference frame. This may be used to generate a 3D profile of the first subsea object that is oriented within the reference frame. Although, in one embodiment the first object may be a stationary object e.g. on the seabed, it is not excluded that the first object may be any object for which a position with respect to the reference frame is to be determined. This may also include the imaging device or e.g. the ROV on which it is mounted. Once this position has been established within the reference frame, the information may be used for other purposes and the position of other objects may be determined.

According to one embodiment of the invention, the beacons may be disposable. In this context, disposable is intended to denote that the beacons are intended for a single use and may be left behind on the seabed without detriment to the environment. They may be provided with a power source that is environmentally friendly and that will decompose in due course. They may also comprise batteries that operate on immersion in sea water. A number of disposable beacons may be dropped over the area of interest at random to define the reference frame.

Alternatively, the beacons may be recoverable and reusable. In that case, they may be provided with rechargeable or replaceable energy sources. They may also be provided with magnets to facilitate recovery or other means for connection to or recovery by an ROV.

At least one of the beacons may be configured for attachment to a subsea object to be surveyed. The form of the attachment may depend upon the nature of the subsea object. Attachment may be by magnet or the light source may be provided on a suitable stab-in to provide a defined orientation with respect to a pipe end or flange. By attaching a light source to the object, this attached light source may be taken into account in establishing the reference frame. Subsequently, the position and orientation of the object with respect to the attached light source may be determined by photographic inspection, laser striping or the like. Alternatively, a number of light sources may be attached in a defined configuration in order to determine 3D position and orientation of part of the object.

In certain embodiments, it may be desirable that the beacon comprises an orientation sensor arranged to determine at least a pitch and a roll of the beacon. For rotationally symmetrical beacons, pitch and roll, defining the elevation angle of the light source with respect to another point on the beacon may be sufficient. This may be required when the beacon carries another light source or acoustic transponder or where it is required to attach to an object. In certain situations, it may be desirable to provide full orientation information for the beacon including heading, pitch and roll. This may be relevant when the beacon is directional or not rotationally symmetrical.

In a still further configuration of the beacon, it may be provided with its own communication capability, enabling it to communicate with another similar beacon or with the rover. In this context, merely emitting light or an acoustic pulse is not intended to constitute communication and the term communication capability is intended to denote that the beacon is able to transmit data. Communication may provide the ability that upon interrogation from the interrogator, the beacon will be able to transmit a minimum of its ID, its battery life if available, and its roll, pitch and heading if available. Further communication may provide the ability to put the beacon into a power sleep mode or to restore from same. Communication may be by encoded light or acoustic pulses or some other form of modulation. Communication may be at relatively low data rates and require several seconds to complete a transaction. The data may include unique identification information, orientation information, position information with respect to other beacons and handshaking data required to initiate a communication protocol According to another aspect of the invention, there is provided a method of enhancing position information for a rover, moving within a reference frame underwater, the rover carrying an imaging device and being in communication with a processor for evaluating position data relating to the momentary position of the rover, the method comprising: providing a beacon having a light source; placing the beacon at a fixed position within the reference frame; moving the rover within the reference frame to different viewpoints; generating direction data representing a direction of the light source with respect to the imaging device from the different viewpoints; and providing the direction data to the processor. The method may be implemented entirely by a suitable control device or may be partially or entirely performed by a human operator, preferably, using the positioning system or beacons as described above or hereinafter. For people skilled in the art of surveying it will be understood that providing just one light source within an existing configuration will already improve the positioning solution, in particular with respect to drift. In the case of further light sources or other additional information associated with the light sources, the solution is still further improved. In the case of just four light sources arranged in a geometrically suitable configuration, the relative position of a rover can be determined unambiguously without any additional information. Any additional independent observation (light source or other) will provide redundancy and therefore improve the robustness of the solution and allow for quality control and fault tolerance.

In one embodiment, the beacons may be randomly dropped within the reference frame. Such a procedure may allow for a high degree of redundancy. More preferably, the light sources are placed at positions that enhance the resulting calculations and at distances dependent upon the visibility. In one embodiment, at least three light sources should be visible from any single location but more preferably, four or more light sources may be visible in order to provide greater redundancy and fault tolerance.

The method preferably comprises determining the direction data by viewing the light sources with the imaging device, determining the co-ordinates of the center of a light source and transmitting the co-ordinates to a processing device without the transmission of further image data. As has been described above, the imaging device may be adapted to this purpose and needs only to identify the centers of given light sources in order to determine the angle subtended at the reference plane of the imaging device.

Processing can therefore take place on the basis of this data alone and other surrounding imagery need not be transmitted. The imaging device may simultaneously transmit the co-ordinates of the at least three light sources or may submit data in pairs, based on sequential observations. In that case, time stamp data for each observation may be required. By avoiding the transmission of full photographic image data, significant bandwidth can be spared. Furthermore, identifying the center of a light source is relatively simple and accurate, irrespective of the size or brightness of the light source and irrespective of turbidity of the water.

The method may additionally comprise establishing a distance between the light source and the imaging device. As described above, various procedures may be implemented, individually or in combination to achieve this result. Additionally or alternatively, a relative position of the imaging device within the reference frame may be established by determining at least one length dimension within the reference frame. It will be understood that once the imaging device has determined the geometric shape defined by a number of light sources, one single length dimension can establish the relevant scale. This can be either a distance between two light sources, a distance between a light source and the imaging device or the distance between two imaging viewpoints.

In one embodiment, determining at least one length dimension within the reference frame comprises placing two light sources a known distance apart. This may be achieved by locating two light sources on a fixed bar having a predefined length dimension relevant to the location being surveyed. The two light sources should of course be identifiable e.g. by giving them a different color. Alternatively, additional light sources on the same fixed structure could serve to identify the fixed light sources e.g. by virtue of their configuration in which all lights being co-linear may be one potential configuration.

In another embodiment, the method of determining at least one length dimension within the reference frame comprises providing at least one acoustic transponder associated with a light source and measuring a linear distance from the imaging device to the acoustic transponder. As has been discussed above, acoustic transponders can be used for accurately determining distance underwater in various manners and interrogation of the transponder by suitable means aboard the rover can provide a relatively accurate distance measurement. It will also be understood that two beacons provided with acoustic transponders may interrogate each other to determine their separation and communicate this information with the rover or processing device.

In a further embodiment, an Inertial Navigation System (INS) is associated with the imaging device and the step of determining at least one length dimension within the reference frame comprises moving the imaging device from a first viewpoint to a second viewpoint and determining a distance or 3D vector between the first and second viewpoint using data from the INS. The INS may be as described above and may be aided, where available by any number of additional inputs.

The method is particularly applicable to underwater metrology in determining the position and/or orientation of a first object and possible further objects within a reference frame. Various methods may be implemented to determine the position and orientation of the first object with respect to the imaging device. In one embodiment, this may comprise forming a plurality of photographic images of the first object from the imaging device or a device associated with the imaging device. Photogrammetry techniques may then be used to reconstruct the 3D position and orientation of the first object with respect to the reference frame.

In another embodiment, determining the position and/or orientation of the first object with respect to the imaging device may comprise laser striping the first object and generating a 3D profile of the first object. In this case, a laser striping device and imaging device may be associated and movable together with the imaging device e.g. aboard an ROV.

Once the first object has been surveyed, the method may be used to determine the position and/or orientation of a second object with respect to the imaging device. In this way, the relative position and orientations of the second object to the first object can be calculated. In this case, the second object must be located in the same frame of reference as the light sources that define the frame of reference for the first object. In other words, light sources are required to span the region between the first and the second objects such that the whole region can be defined as a single reference frame in which the first and second objects are also defined. At any point within the reference frame, the imaging device should preferably be able to observe sufficient light sources to ensure drift free and accurate positioning of the rover. It may be desirable that at least two, three, four or even more light sources remain in view of the rover at any point in time.

The invention also relates to an underwater beacon for use in the method described above and hereinafter. The beacon comprises a weighted base and a light source at an upper side. In a preferred embodiment, the light source should be visible from all directions within a horizontal plane. Preferably, the light source should be visible i.e. not obstructed, within a solid angle of at least 180°, more preferably at least 220°, allowing for viewing even when beacons are located at different elevations on the seabed. Preferably, the device is constructed to adopt a vertical position in the water. This may be achieved by providing a relatively small base and by having the upper side of the beacon being relatively more buoyant than the base.

In another embodiment, the beacon may be disposable. As indicated above, disposable is intended to denote that the beacon is intended for a single use and may be left behind on the seabed without detriment to the environment. The beacon may be provided with a power source that is environmentally friendly and that will decompose in due course, preferably within a period not exceeding five years. It may also comprise batteries that operate on immersion in sea water. Alternatively, the beacon may be recoverable and reusable. In that case, it may be provided with a rechargeable or replaceable energy source. The beacon may also be provided with a magnet to facilitate recovery or with other means for connection to or recovery by an ROV.

In one specific embodiment, the underwater beacon further comprises an acoustic transponder with the light source being located above and aligned vertically with the acoustic transponder. Preferably, the acoustic transponder is oriented outwards with the light source located above it and aligned therewith such that only a Z-offset between the light source and the acoustic transponder needs to be taken into account. Other beacon configurations may include multiple light sources, orientation sensors and communication capabilities.

The invention also relates to an underwater rover comprising an imaging device and an orientation sensor associated with the imaging device for determining an orientation of the imaging device with respect to a reference frame, the rover being controllable to perform the method described above or as claimed herein. The rover may be controllable by a computer program product adapted to perform the methods as described above and hereinafter.

According to another aspect, which may be regarded as an alternative to the first aspect, there is provided an underwater positioning system for providing position information for a rover, wherein the rover is adapted for deployment in a body of water and for moving within a reference frame, wherein the system comprises: —a light source provided in or on the rover and moveable together with the rover between different positions with respect to the reference frame; —a beacon provided with an underwater imaging device and adapted for deployment in the body of water at a fixed position with respect to the reference frame, wherein the underwater imaging device is configured to observe the light source at the different positions and to determine direction data representing a direction or change in direction of the light source with respect to the imaging device; —an orientation sensor, associated with the rover and configured to determine an orientation of the rover with respect to the reference frame and to generate orientation data, and—a scaling element for providing scaling data representative of a distance between the imaging device and the light source.

In correspondence with the advantages and effects described herein above with reference to the first aspect, high levels of accuracy may also be achieved over considerable distances by using an active light source as a rover position marker. For a beacon with an imaging device that is designed for static deployment on the bed of the body of water, a reference frame can be established that remains fixed with respect to an earth coordinate system. The reference frame will experience much less or even virtually no drift. The reduction of drift will in turn improve the accuracy of associating detected light sources to actual orientations and/or positions of the rover.

Extra weight or attachment mechanisms may be provided on the beacon to further stabilize the beacon in the deployed state. In addition, a beacon designed for static deployment may have a small size and compact shape, thereby allowing the imaging device on the beacon to have a (nearly) unobstructed view in any or nearly all relevant directions to observe as many light sources as possible.

In one embodiment, the scaling element may comprise the light source and at least one further light source mounted in or on the rover at a predetermined non-zero distance from the light source. This may be in the form of a predetermined spatial distribution of light sources mounted in or on the rover. Possibly, the light sources at the predetermined mounting points may have different emission characteristics (e.g. typical wavelength ranges and peak-intensity wavelengths), which facilitates identification of the orientation of the rover in the sensor readings by the imaging device.

Again, the light source(s) may be one or more LEDs adapted for emitting light with wavelengths substantially in a range of 420 nanometers to 520 nanometers and an intensity maximum in the range of 460 nanometers to 480 nanometers.

Scaling may also be achieved in an alternative embodiment by providing stereo imaging capability. For example, the positioning system may comprise at least one further beacon provided with a further underwater imaging device. The scaling element may then include the further underwater imaging device located at a fixed distance from the first imaging device, and the positioning system may then be configured to triangulate distance to the one or more light sources on the rover. An initial calibration procedure may be carried out to determine relative positions of the beacons and their respective imaging devices.

In an alternative arrangement, the scaling element may comprise an acoustic transponder located in or on the beacon at a known position with respect to the imaging device and a corresponding acoustic transceiver associated with the rover. By appropriate triangulation between the at least one light source and with the addition of a single distance measurement from the beacon with the imaging device to one light source on the rover, the overall scale of the reference frame can be determined. For this purpose, the accuracy of the acoustically measured distance needs to be adequate for the desired position accuracy within the reference frame. The acoustic beacon may be located adjacent to the imaging device with a known off-set. Most preferably, the acoustic beacon is located vertically below the imaging device. A solution other than vertical might require additional attitude capability to determine the offset direction. In the case of an ROV, the light source(s) as well as the acoustic receiver will be mounted in/on the ROV with predetermined offsets from each other.

According to another embodiment of the invention, the system further comprises an Inertial Navigation System (INS) associated and moveable together with the rover. INS's are generally conventional devices, used to provide relative and absolute local orientation and position information. Reference to an INS is not intended to be restrictive on any particular principle of operation and should include any motion sensor capable of determining changes in 3D position. In particular, the INS may be based on mechanical gyroscopic action, fiber optic gyroscopes (FOG), laser ring gyroscopes (LRG), MEMS based technologies, accelerometers, magnetometers or any combination of the above. Most preferably, the INS is "north-seeking" in that it comprises a heading indicator allowing momentary determination of its attitude with respect to the earth, in particular, geodetic or magnetic north. Additionally, the INS should preferably be an aided INS, in that it is provided with additional inputs to improve the INS accuracy. This may include hydro acoustic positioning, a depth sensor providing an absolute depth measurement and/or a verticality sensor, providing orientation with respect to the earth's gravitational field and the USBL, SBL and DVL systems mentioned above. These additional sensors may be part of the INS or associated therewith as part of an integrated aided INS solution.

In a more preferred embodiment, the INS may be used as the scaling element to determine at least a distance between a first position and a second position of the rover with respect to the reference frame. Conventional procedures for improving accuracy, including drift compensation and repetition of measurement may be used to enhance the scaling determination results. Although, for determining the scale of the reference frame, a linear distance between the first position and the second position may be sufficient, preferably the INS is arranged to determine the 3D vector from the first to the second positions of the rover. In this manner, the relative orientation of the local reference frame of the rover with respect to the (e.g. global) reference frame associated with the beacon may be easily determined. Ideally, photogrammetric angular measurements are processed together with INS and other available observational data in a single navigation engine, which enables continuous update of the scale.

In another embodiment, the scaling element may comprise a depth sensor associated with the rover and capable of resolving changes in depth thereof. In this manner, movement in the Z-direction between a first position and a second position of the rover may be determined and used alone or together with other data to evaluate the scaling data.

Although the above discussed scaling elements may each be used independently, most preferably, the system is provided with a number of alternative scaling elements that work together to improve accuracy and provide fault tolerance. The INS may be used for maintaining accuracy or resolving ambiguities at locations where insufficient light sources of the rover are visible for the imaging device, or in conditions where visibility becomes poor. Acoustic transponders may help resolve ambiguities when the determined angles give poor accuracy.

Where multiple sensor devices work together to achieve the required accuracy, careful time stamping of sensor data from distinct sensors is preferred over rough time binning. Most preferably the system comprises a clock arranged to time stamp the scaling data relative to the direction data. It will also be understood that determining the direction data may already require time stamping of the orientation data relative to the image produced by the imaging device. In this manner, the momentary orientation of the image perceived by the imaging device can be evaluated based on the combination of the INS data and the imaging data. The data should preferably be time stamped to an accuracy of at least 1 millisecond. Most preferably, the time stamp will be accurate to around 0.1 milliseconds. The required timing accuracy, including unaccounted processing and communication latencies, may depend on the required measurement precision and the expected movement rate of the imaging device.

The system preferably comprises a processor arranged to receive and analyze the direction data and the scaling data to determine the position information. In one embodiment, the processor is local to the rover and may be integrated therewith. The processor may thus be located subsea e.g. on the rover, thereby eliminating the need for signal transmission to the surface. Transmission to the surface may be limited to resultant processed data or alternatively data may be logged and delivered to the surface for processing on return of the imaging device and processor e.g. in the case of AUVs.

It will be understood that cooperation between a single imaging device and a single light source may provide considerable added information to an existing system. According to a further embodiment of the invention, the system may comprise a plurality of beacons, each having at least one imaging device. The beacons are adapted to be deployed in a body of water to form a beacon matrix or network. Additional beacons will increase the measurement redundancy and accuracy of the system and different techniques may be used to take advantage of them. In particular, standard Simultaneous Localization and Positioning (SLAM) processes may be applied to resolve the matrix. In one embodiment, the beacons may be located randomly in the vicinity of an object to be surveyed to form a beacon matrix. The matrix may have scale and dimension according to the task at hand. For subsea operations around an engineering installation, the matrix may typically have a maximum dimension of between 50 meters and 5 kilometers. It will however be understood that there is no limit to the number of beacons that may be installed. Theoretically, such beacons could plot the route of a pipeline over many kilometers. Under turbid conditions, the matrix may require individual beacons to be close together.

It is understood that the brightness of the light source(s) required may vary from a few lumens to over a thousand depending on the distances involved and water clarity. The light source(s) in/on the rover may have adjustable intensity setting(s), to dynamically adapt the required brightness of the light source(s) to the visual conditions of the water and the desired detection accuracy of the beacon(s). Preferably, the intensity is dynamically set so as to avoid over-exposure effects (e.g. pixel saturation, blooming, etc.) in the imaging device, which would deteriorate light detection and localization accuracy in the acquired images.

In one embodiment, the imaging device on the beacon may comprise one or more cameras arranged to capture direction data within a horizontal field of vision of at least 90°, preferably at least 180° and more preferably over 360°. The cameras may even cooperate to generate hemispheric images, with a combined field of view extending over a substantial solid angle. In applications with an approximately flat seabed, this solid angle may for example be $\Omega=2\pi$ steradian. Increasing the field of vision allows the imaging device to identify multiple light sources on the rover independently of the position of the rover with respect to the beacon. It will be understood that the accuracy of resolution of angles between the light sources within a single image may be better than that achieved when the imaging device itself must pan Once the position of the rover within the reference frame has been established, the position and attitude of the first subsea object with respect to the reference frame can be determined. This may be achieved by various conventional procedures.

According to one preferred embodiment, the system may comprise a laser striping and imaging device associated and movable together with the rover for generating a 3D profile of objects within the reference frame. This may be used to generate a 3D profile of the first subsea object that is oriented within the reference frame. Although, in one embodiment the first object may be a stationary object e.g. on the seabed, it is not excluded that the first object may be any object for which a position with respect to the reference frame is to be determined.

The beacons may be recoverable and reusable. In that case, they may be provided with rechargeable or replaceable energy sources. The beacon(s) may also be provided with magnets to facilitate recovery or other means for connection to or recovery by an ROV.

At least one of the beacons may be configured for attachment to a subsea object to be surveyed. The form of the attachment may depend upon the nature of the subsea object. Attachment may be by magnet, or a self-locking clamp, or the imaging device may be provided on a suitable stab-in to provide a defined orientation with respect to a pipe end or flange. By attaching the beacon with imaging device to the object, the reference frame will be established (i.e. have its origin) at the site of the surveyed object, so that potential measurement and positioning errors become smallest when the rover is near the imaging device while surveying the object. Subsequently, the position and orientation of the object with respect to the attached beacon may be determined by photographic inspection, laser striping or the like.

Alternatively or in addition, a further beacon with a further light source may be provided, this further beacon being configured for attachment to a subsea object to be surveyed. Also for this further beacon, the form of the attachment may depend upon the nature of the subsea object. Attachment may be by magnet, or a self-locking clamp, or the further light source may be provided on a suitable stab-in to provide a defined orientation with respect to the pipe end or flange. This further beacon with further light source is preferably deployed within the field of view of the beacon with imaging device. By attaching the further beacon to the object, the imaging device of the beacon may simultaneously observe the attached (i.e. stationary) further light source on the further beacon and the (moving) light sources on the rover. The simultaneous light observations may be taken into account in establishing the relation between the positions of the rover and the surveyed object with respect to the reference frame. Multiple light sources may be attached in a defined configuration in order to determine 3D position and orientation of (part of) the object.

In certain embodiments, it may be desirable that the beacon or the further beacon comprises an orientation sensor arranged to determine at least a pitch and a roll of the (further) beacon. For rotationally symmetrical (further) beacons, pitch and roll, defining the elevation angle of the imaging device on the beacon or the further light source on the further beacon with respect to another point on the (further) beacon may be sufficient. This may be required when the (further) beacon carries an acoustic transponder or where it is required to attach to an object. In certain situations it may be desirable to provide full orientation information for the (further) beacon including heading, pitch and roll. This may be relevant when the (further) beacon is directional or not rotationally symmetrical.

In embodiments, the beacon may be provided with a processor configured for determining the position information for the rover from the direction data and the scaling data. Alternatively, the processor may only be configured to determine pixel coordinates of detected light sources in images acquired by the imaging device, and to store these coordinates for further use and/or transmission to the rover.

In further embodiments, the beacon may comprise a communication device arranged for wireless transmission of the position information and/or the determined pixel coordinates of detected light sources through the body of water to the rover. At least one of acoustic transmission, optical transmission, and electromagnetic transmission techniques may be used for conveying the position information from the beacon to the rover.

Accordingly, the beacon may be provided with its own communication capability, enabling it to communicate with another similar beacon, with the further beacon provided with a further light source, or with the rover. In this context, merely emitting a single electromagnetic (e.g. radio or light) pulse or a single acoustic pulse is not intended to constitute communication. The term "communication capability" is intended to denote that the beacon is able to transmit data. Communication may provide the ability that upon interrogation from the interrogator, the beacon will be able to transmit a minimum of its ID, its battery life if available, and its roll, pitch and heading if available. Further communication may provide the ability to put the beacon into a power sleep mode or to restore from same. Communication may be by a train of encoded electromagnetic or acoustic pulses or some other form of modulation. Communication may be at relatively low data rates and requires several seconds to complete a transaction. The data may include the calculated position information for the rover, the determined pixel coordinates of detected light sources, unique identification information, orientation information, position information with respect to other beacons and handshaking data required to initiate a communication protocol.

According to yet another aspect of the invention, there is provided a method of enhancing position information for a rover moving in a body of water and within a reference frame corresponding to the body of water, wherein the rover is provided with a light source and is in communication with a processor for evaluating position data relating to the momentary position of the rover with respect to the reference frame, wherein the method comprises: —providing a beacon with an underwater imaging device, wherein the underwater imaging device is configured to observe the light source at different positions and to determine direction data representing a direction or change in direction of the light source with respect to the imaging device; —deploying the beacon in the body of water at a fixed position with respect to the reference frame; —moving the rover within the reference frame to different viewpoints; —generating direction data representing a direction of the light source with respect to the imaging device from the different viewpoints; and—providing the direction data to the processor.

The method may be implemented entirely by a suitable control device or may be partially or entirely performed by a human operator, preferably, using the positioning system or beacons as described above or hereinafter.

For people skilled in the art of surveying it will be understood that providing and sensing/monitoring just one light source within an existing configuration will already improve the positioning solution, in particular with respect to drift. In the case of further light sources or other additional information associated with the light sources, the solution is still further improved. In the case of just four light sources arranged in a geometrically suitable configuration on the rover, the relative position of a rover can be determined unambiguously without any additional information. Any additional independent observation (light source or other) will provide redundancy and therefore improve the robustness of the solution and allow for quality control and fault tolerance.

In one embodiment, the beacons may be randomly dropped within the reference frame. Such a procedure may allow for a high degree of redundancy.

The light sources may be placed at positions in or on the rover that enhance the resulting calculations and at distances dependent upon the visibility. In one embodiment, at least three light sources should be visible from any single location but more preferably, four or more light sources may be visible in order to provide greater redundancy and fault tolerance.

The method preferably comprises determining the direction data by viewing the light sources with the imaging device, determining the co-ordinates of the center of a light source and transmitting the co-ordinates to a processing device without the transmission of further image data. As has been described above, the imaging device may be adapted to only identify the centers of given light sources in order to determine the angle subtended at the reference plane of the imaging device. Processing can therefore take place on the basis of this data alone and other surrounding imagery need not be transmitted by the beacon to the rover. The imaging device may simultaneously transmit the co-ordinates of the at least three light sources or may submit data in pairs, based on sequential observations. In that case, time stamp data for each observation may be required. By avoiding the transmission of full photographic image data from the beacon to the rover, far less data needs to be transmitted. This allows a beacon to carry less complex communication equipment. Alternatively or in addition, the required observation data may thus be transmitted to the rover more quickly, allowing the rover to employ this additional coordinate data (almost) in 'real-time' during the (dynamic) position estimations. Furthermore, identifying the center of a light source is relatively simple and accurate, irrespective of the size or brightness of the light source and irrespective of turbidity of the water. A light source center detection algorithm may therefore be implemented at the image processing unit of the imaging device.

The method may additionally comprise establishing a distance between the beacon and the rover. As described above, various procedures may be implemented, individually or in combination to achieve this result.

In one embodiment, two light sources provided on the rover may identifiable e.g. by giving them a different color. Alternatively, additional light sources in a predetermined pattern in/on the rover could serve to identify the main light sources on the rover.

In another embodiment, the method of determining at least one length dimension within the reference frame comprises providing at least one acoustic transponder associated with an imaging device and measuring a linear distance from the imaging device to the acoustic transponder. As has been discussed above, acoustic transponders can be used for accurately determining distance underwater in various manners and interrogation of the transponder by suitable means aboard the rover can provide a relatively accurate distance measurement. It will also be understood that two beacons provided with acoustic transponders may interrogate each other to determine their separation and communicate this information with the rover or processing device.

In a further embodiment, an Inertial Navigation System (INS) is associated with the rover, and the step of determining at least one length dimension within the reference frame comprises moving the rover from a first position to a second position with respect to the reference frame, wherein the second position is different from the first position, and determining a distance or 3D vector between the first and second positions using data from the INS. The INS may be as described above and may be aided, where available by any number of additional inputs.

The method is particularly applicable to underwater metrology in determining the position and/or orientation of a first object and possible further objects within a reference frame. Various methods may be implemented to determine the position and orientation of the first object with respect to the imaging device on the beacon. In one embodiment, this may comprise forming a plurality of photographic images of the first object from the imaging device or a device associated with the imaging device. Photogrammetry techniques may then be used to reconstruct the 3D position and orientation of the first object with respect to the reference frame.

In another embodiment, determining the position and/or orientation of the first object with respect to the imaging device may comprise laser striping the first object and generating a 3D profile of the first object. In this case, a laser striping device may be associated and movable together with the rover e.g. aboard an ROV.

Once the first object has been surveyed, the method may be used to determine the position and/or orientation of a second object with respect to the rover. In this way, the relative position and orientations of the second object to the first object can be calculated. In this case, the rover must be within the field of view of the imaging device in both of the rover positions assumed during surveyance of the first and second objects, and the position of the rover with respect to the reference frame must be determinable for both positions. In other words, the field of view of the imaging device is required to span both the regions directly surrounding the first and the second objects, at least at locations where the rover and its light sources remain visible for the imaging device during surveyance of the two objects. The imaging device should preferably be able to observe sufficient light sources to ensure drift free and accurate positioning of the rover. It may be desirable that at least two, three, four or even more light sources on the rover (if present) remain in view of the imaging device on the beacon at any point in time.

The invention also relates to an underwater beacon for use in the method described above and hereinafter. The beacon comprises a weighted base and an imaging device at an upper side. In a preferred embodiment, the imaging device should have a field of view in all directions within a horizontal plane. Preferably the light source should be visible i.e. not obstructed, within a solid angle of at least $2\pi$ steradian, and/or within a vertical angle of at least 180°, more preferably at least 220°, allowing for viewing even when beacons are located at different elevations on the seabed. Preferably, the device is constructed to adopt a vertical position in the water. This may be achieved by providing a relatively small base and by having the upper side of the beacon being relatively more buoyant than the base.

In one specific embodiment, the underwater beacon further comprises an acoustic transponder with the imaging device being located above and aligned vertically with the acoustic transponder. Preferably, the acoustic transponder is oriented outwards with the imaging device located above it and aligned therewith such that only a Z-offset between the imaging device and the acoustic transponder needs to be taken into account. Other beacon configurations may include multiple imaging devices, orientation sensors and communication capabilities.

The invention also relates to an underwater rover comprising one or more light sources and an orientation sensor associated with the rover for determining an orientation of the rover with respect to a reference frame, the rover being controllable to perform the method described above or as claimed herein. The rover may be controllable by a computer program product adapted to perform the methods as described above and hereinafter.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element, while the element label will include an appended letter (e.g., "20a") to refer to a specific instance of the element.

The figures are meant for illustrative purposes only, and do not serve as restriction of the scope or the protection as laid down by the claims.

DESCRIPTION OF EMBODIMENTS

Figure 1:
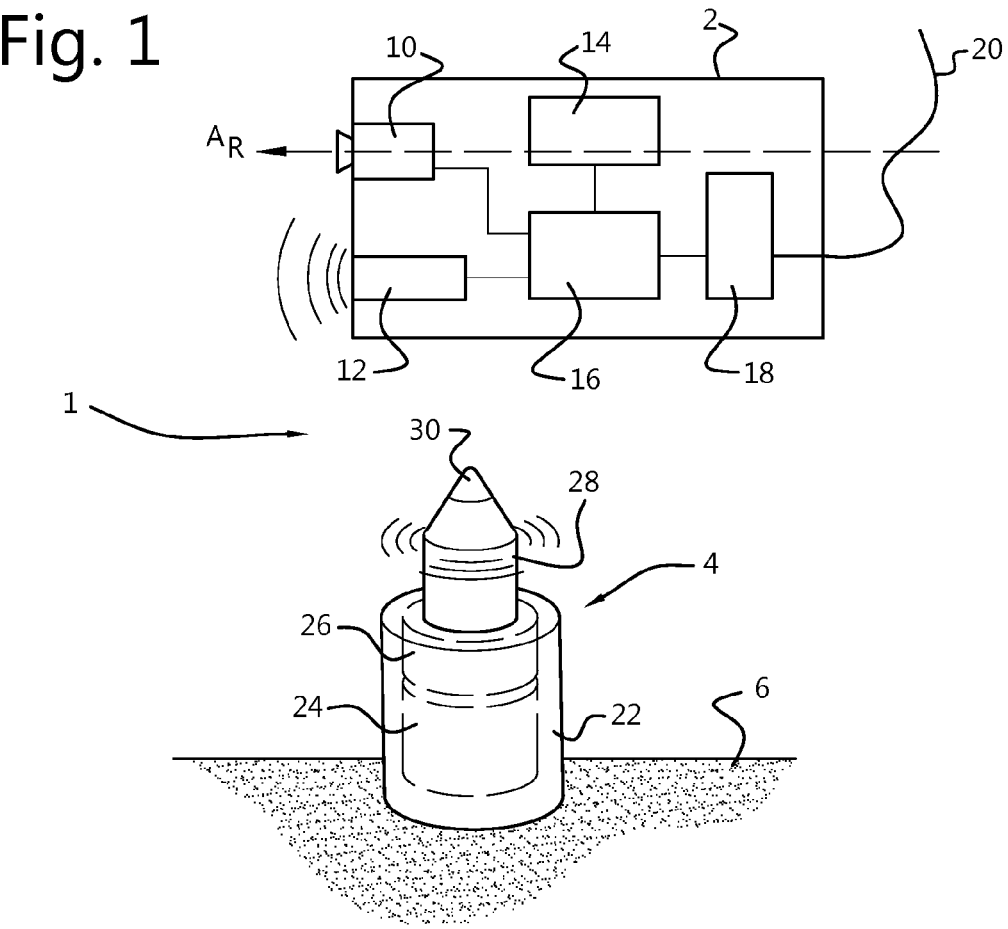
FIG. 1 shows a schematic view of an underwater positioning system according to a first embodiment of the invention.

FIG. 1 shows a schematic view of an underwater positioning system 1 according to a first embodiment. The system comprises an ROV 2 and a beacon 4, both being suitable for underwater operation, the beacon being located on the seabed 6. The ROV 2 includes a photogrammetric camera 10, an acoustic transceiver 12, an orientation sensor 14, processor 16 and a communications interface 18, which connects with an umbilical 20. The ROV 2 may be a generally conventional device as used for underwater operations and survey and will be further provided with all of the necessary facilities for maneuvering itself and other objects and for communicating with the surface. It will also be understood that although the embodiments are explained with reference to an ROV, the same principles may be applied to completely autonomous vehicles and to handheld rovers carried by a diver or the like. The camera 10 is a calibrated wide-angle camera having a field of view of around 120 degrees and directed to produce an image relative to an axis AR of the ROV 2. The orientation sensor 14 is a pitch/roll/heading sensor adapted to output to the processor 16 the orientation of the axis AR at any point in time. The orientation sensor 14 may be a conventional solid state gravitational/magnetic sensor with dynamic accuracy of better than 0.2 degrees. It will be understood that the accuracy of individual components may be chosen according to the overall accuracy required, their relevance to the overall accuracy and the degree of redundancy with respect to other components.

The beacon 4 has a base 22, in which is located battery 24 and electronics 26. The base 22 is relatively heavy, ensuring that the beacon 4 assumes a vertical orientation when placed on the seabed 6. Above the base 22 is located an acoustic transponder 28 and a light source 30. Light source 30 is a high power green/blue LED giving a visibility of up to about 200 meters in clear water. Light source 30 is positioned at the top of the beacon 4 to be visible from all directions and over a solid angle of more than $2\pi$ steradian.

Figure 2:
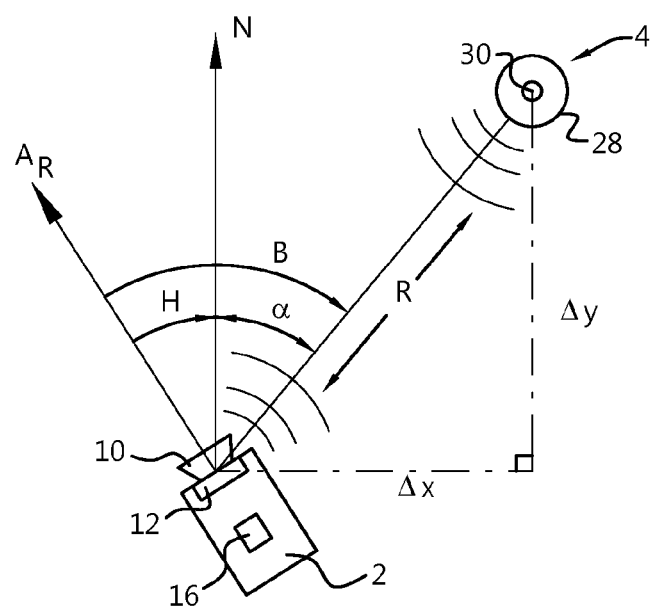
FIG. 2 indicates schematically the relative positions of the ROV and beacon of FIG. 1.

Operation of the positioning system 1 will now be explained with reference to FIG. 2, which shows a schematic plan view of the ROV 2 and beacon 4. The ROV 2 has its axis AR directed at a heading H with respect to North N. The processor 16 controls operation of the camera 10 to produce a photogrammetric image of the light source 30 on beacon 4. Based on the reading, the processor can calculate the bearing B to the light source 30 and its angle $\alpha$ with respect to North N. The processor 16 also interrogates the beacon 4 using the transceiver 12 to pulse the transponder 28 and detect a returned pulse. The transmission time is converted into a range R using conventional ranging techniques for the given water depth and temperature. Although not further discussed it will be understood that all additional readings required for performing such ranging will be provided either from sensors aboard the ROV or elsewhere. Once bearing and range are determined for the beacon 4 relative to the ROV, the $\Delta x$ and $\Delta y$ offsets from the ROV 2 to the beacon 4 can be evaluated. It will thus be understood that for a fixed location of the beacon 4, the position of the ROV 2 can be established. Conversely, if the position of the ROV 2 is known, the location of the beacon 4 may be established. In FIG. 2, the situation is illustrated for a two-dimensional configuration in which, for simplicity, only bearing is taken into consideration. It will be understood that in practice, elevation will also be taken into account and the $\Delta z$ value will also be determined.

Figure 3:
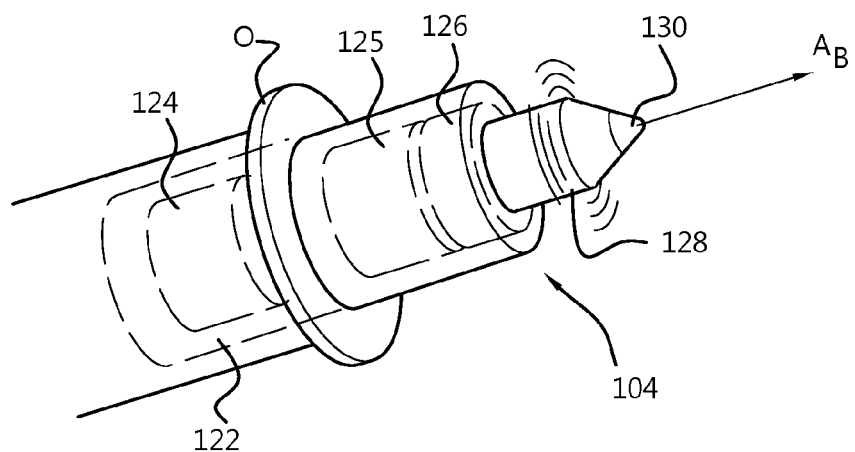
FIG. 3 illustrates in perspective view an alternative beacon.

FIG. 3 shows a beacon 104 according to an alternative embodiment, which is used for connection to an underwater object O to be surveyed. The beacon 104 comprises a stab-in base 122 sized to engage with the object O. As in the earlier embodiment of FIG. 1, the base includes a battery 124 but in this embodiment, there is also provided an orientation sensor 125 and communication electronics 126. A light source 130 is located at the end of the beacon 104 opposite to the base 122 aligned with an axis AB of the beacon 104. On the axis AB between the base and the light source 130 is located a transponder 128. The beacon 104 can be attached to the object O, which in the illustrated embodiment is a pipe flange and allows the orientation of the axis AB to be established and communicated by the communication electronics 126 to an external device. In this case, communication takes place via the acoustic transponder 128 to the transceiver 12 on the ROV 2 as an encoded acoustic pulse stream. Such communication is generally conventional and need not be discussed further herein. It will be understood that communication may also take place by sonar to the surface or that the light source 130 could also be modulated for the transmission of information.

Figure 4:
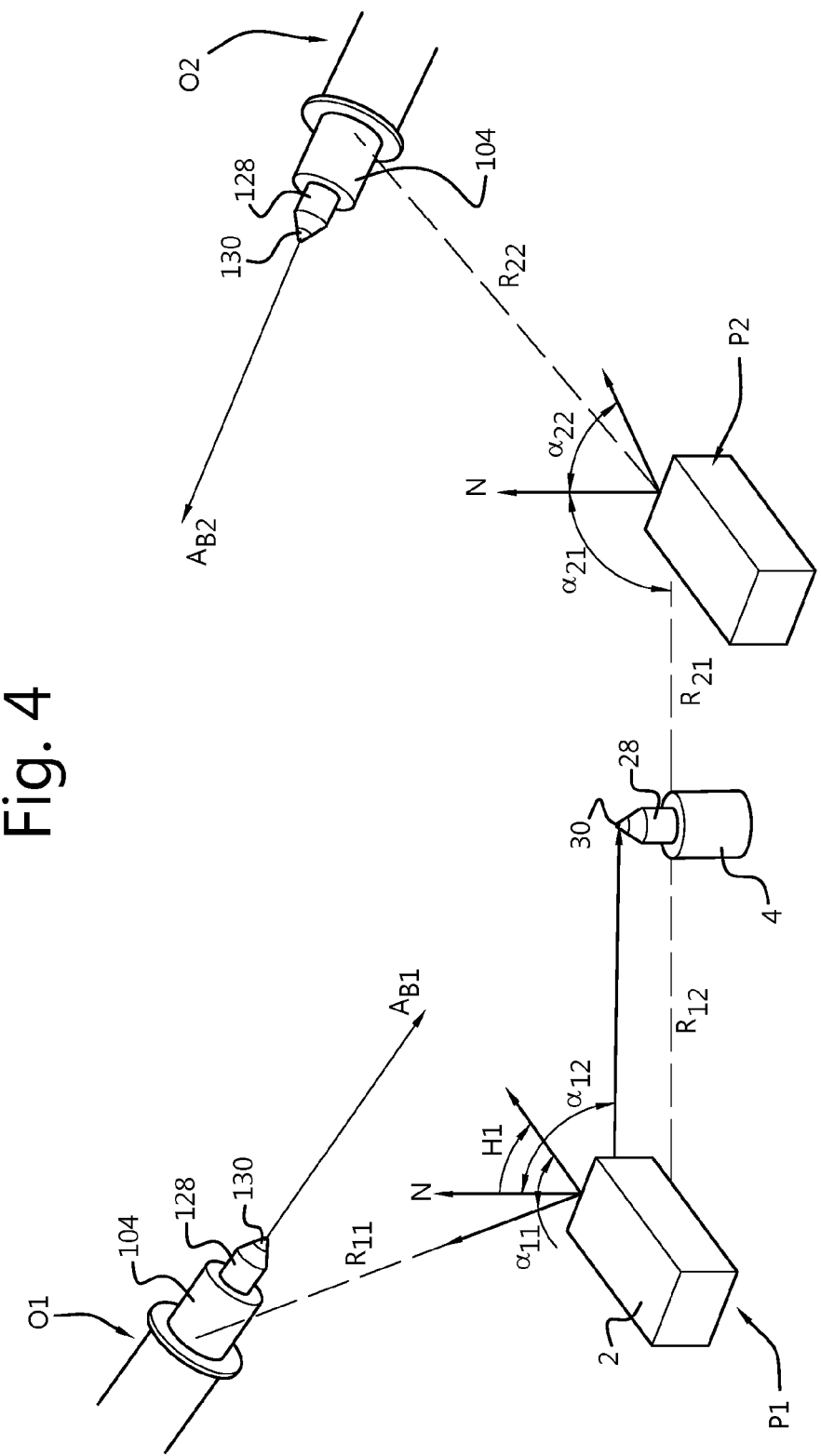
FIG. 4 illustrates schematically the use of the system of FIG. 1 in performing metrology.

FIG. 4 shows schematically how the system 1 may be implemented in a metrology procedure to survey from a first underwater target object O1 to a second underwater target object O2. The procedure is particularly convenient for the case that no direct line of sight exists between the targets but is equally applicable should this not be the case. According to FIG. 4, each of the objects O1, O2 is provided with a beacon 104 as depicted in FIG. 3. Prior to commencing the procedure, the ROV 2 has dropped a beacon 4 of the type as depicted in FIG. 1 at a location intermediate of the two objects O1, O2. The location of the beacon 4 may be random subject to it being possible to observe the light sources of both the beacon 104 and the beacon 4 simultaneously from the ROV 2 as will be discussed further below.

In operation, the ROV 2 is initially located at a first position P1 whence it may observe the first object O1 and the beacon 4. At this position, the bearing $\alpha 11$ and range R11 of the beacon 104 from the ROV 2 are determined as described in relation to FIG. 2 above. As also described above, even if the precise location of the ROV is not known, its relative position with respect to the first object O1 is now determined in the x, y, z reference frame of the first object O1. The ROV also interrogates the beacon 104 to determine the orientation of the axis AB1. This information is transmitted from the beacon 104 to the ROV 2. Due to the large field of vision of the camera 10, the ROV 2 is able to simultaneously determine the position of the beacon 4 and calculate the bearing $\alpha 12$ and range R12 for beacon 4 with respect to the ROV 2. Since this takes place simultaneously, i.e. without movement or drift of the ROV 2, the position of the beacon 4 in the reference frame of the first object O1 may also be determined. The ROV 2 then moves to a second position P2 between the beacon 4 and the second object O2. It will be understood that the second position P2 may be any random location and there is no need for the ROV 2 to be able to track its own movement during travel from first position P1 to second position P2. Nevertheless, the ability to track its changes in position e.g. by use of an INS may provide additional redundancy to the system. Once at position P2, the ROV 2 uses its camera 10 to determine bearings α21, α22 to the light sources 30, 130 on the beacon 4 and the second object O2. It also interrogates the transponders 28 and 128 to determine respective ranges R21, R22 and receive orientation information concerning the orientation of the axis AB2 of the beacon 104. Based on this data, the processor 16 can determine the position and orientation of the second object O2 in the reference frame of the first target object O1. It will be understood that all this may be achievable without any single absolute position being determined. Nevertheless, it will be understood that additional information and readings can be provided in order to tie in the data described to known reference points. It will also be understood that while the present embodiment has been shown using a single intermediate beacon, the method can be carried out without an intermediate beacon, given that the ROV is able to see both objects from a single position. Furthermore, any number of intermediate beacons may be provided, bridging the gap between two objects or linking an object to a known reference point.

Figure 5:
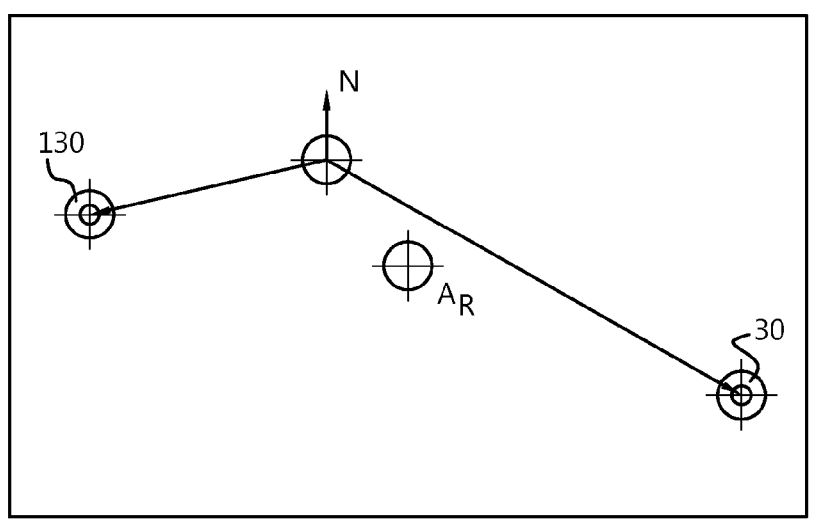
FIG. 5 shows schematically an image perceived from the ROV of FIG. 4.

FIG. 5 shows schematically the image perceived by the camera 10 of the ROV 2 of FIG. 4. The image is depicted as a camera screen although it will be understood that the image may be interpreted numerically and need never be actually displayed on a screen. The point AR is located centrally in the image and represents the heading determined by the axis of the ROV. The point N represents the momentary location of North, and shows the tilt and roll of the axis AR with respect to the horizontal. Points 130 and 30 represent the centers of the light sources on the beacons 104 and 4 respectively. According to an important advantage of the present invention, however distant or fuzzy the light sources 130, 30 may appear, they will always be circular, allowing appropriate image analysis software to determine a central point for each light source. The only information that need be transmitted for each light source based on the image captured by the camera are the co-ordinates of the central point. This considerably relieves the amount of data that need be transmitted. It will be understood that in the depicted embodiment, data is analyzed by the processor 16 onboard the ROV. Nevertheless, in the case that the data is to be transmitted to the surface, a reduction of the amount of data to be transmitted can be highly advantageous.

Figure 6:
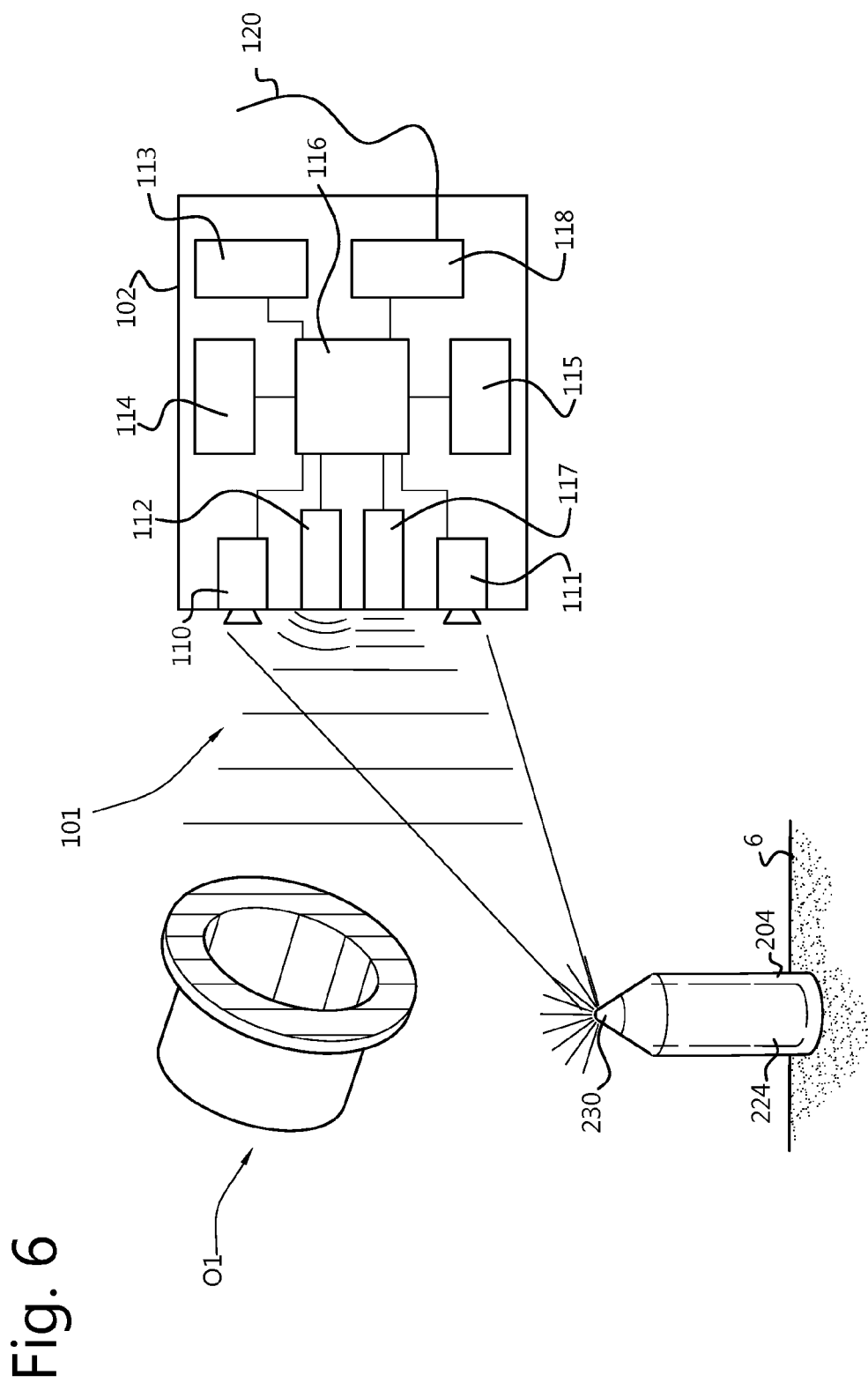
FIG. 6 shows part of a second embodiment of the invention in schematic view.

FIG. 6 shows part of a positioning system 101 according to a second embodiment of the invention. The system 101 includes an ROV 102 with additional capabilities and is shown in operation to survey a first underwater object O1. The ROV 102 is similar to that of FIG. 1 and like features are designated with similar reference numerals preceded by 100. According to FIG. 6, the ROV 102 has first and second cameras 110, 111, located a distance apart and both directed forwards, allowing stereoscopic vision. Furthermore, the ROV 102 is provided with an INS 113, a depth gauge 115 and a laser line scanner 117 allowing 3-D perception of objects within image range. Also shown in FIG. 6 is a passive beacon 204 located on the seabed 6 close to the object O1. The passive beacon 204 is similar to beacon 2 of FIG. 1 but comprises only a light source 230 and battery 224, without acoustic transponder or further electronics or communication capability. For the sake of clarity, the beacons 4 and 104 having communication capability may be referred to as active beacons.

In operation of the system 101, the ROV 102 is initially piloted close to the object O1 and laser striping is used to build up a 3-D image of the object O1, including its position and orientation with respect to the ROV 102. From the same position of the ROV, the cameras 110, 111 are both able to observe the light source 230 and can determine both range and bearing to the light source 230 due to the stereoscopic vision. Once the light source 230 is established within a reference frame of the object O1, the ROV 102 may move to a distant location and, provided it can still see the light source 230, it can determine its new position.

Figure 7:
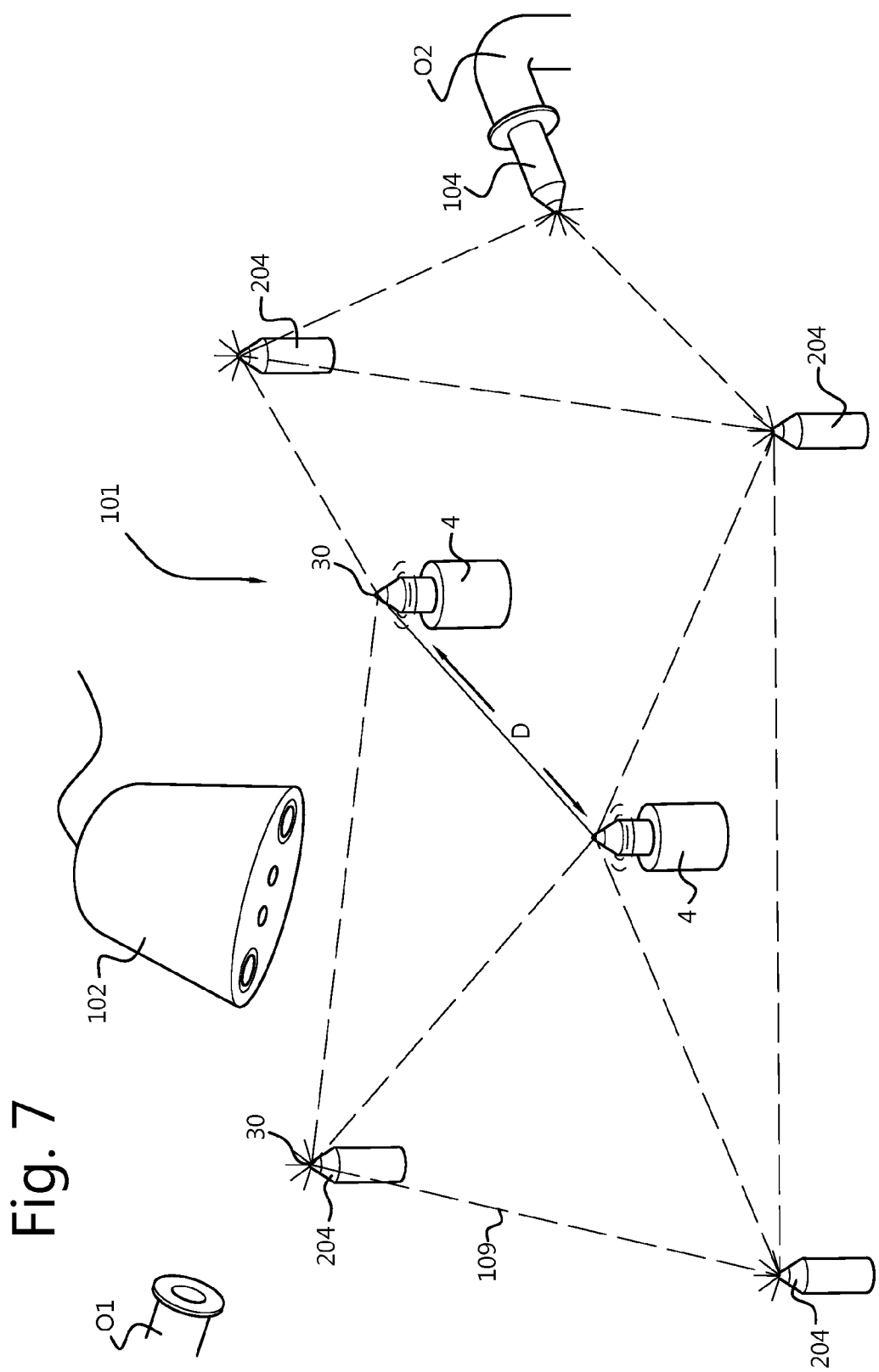
FIG. 7 shows further detail of the underwater positioning system of FIG. 6.

The positioning system 101 of FIG. 6 is further depicted in FIG. 7 illustrating additional active beacons 4 and passive beacons 204 and further including a stab-in beacon 104 engaged with the pipe flange of a second object O2. The beacons 4, 104, 204 form a matrix 109 of lights that can be mapped by the ROV 102 using a combination of techniques. In an initial phase, the ROV 102 flies over the area and uses a SLAM technique to simultaneously locate and map all of the light sources within its visibility. In addition to an initial map of the light sources, the ROV 102 gleans additional information from its INS 113 and its depth gauge 115 regarding its changes in position and uses these to more accurately determine its position with respect to the matrix 109. The active beacons 4 are commanded by the processor 116 to communicate acoustically with each other to determine a distance D between them. This information is reported back to the processor 116, which uses the distance D to more accurately establish the scale of the matrix 109. The light sources 30 on the active beacons 4 may be distinct e.g. in color from the other beacons in order to assist the ROV 102 in identifying those beacons that are providing the distance information D. The positioning system 101 may be used for performing metrology between objects O1 and O2 but may also be left on the seabed in the vicinity of an underwater installation as a navigational aid during operations on the installation.

Figure 8:
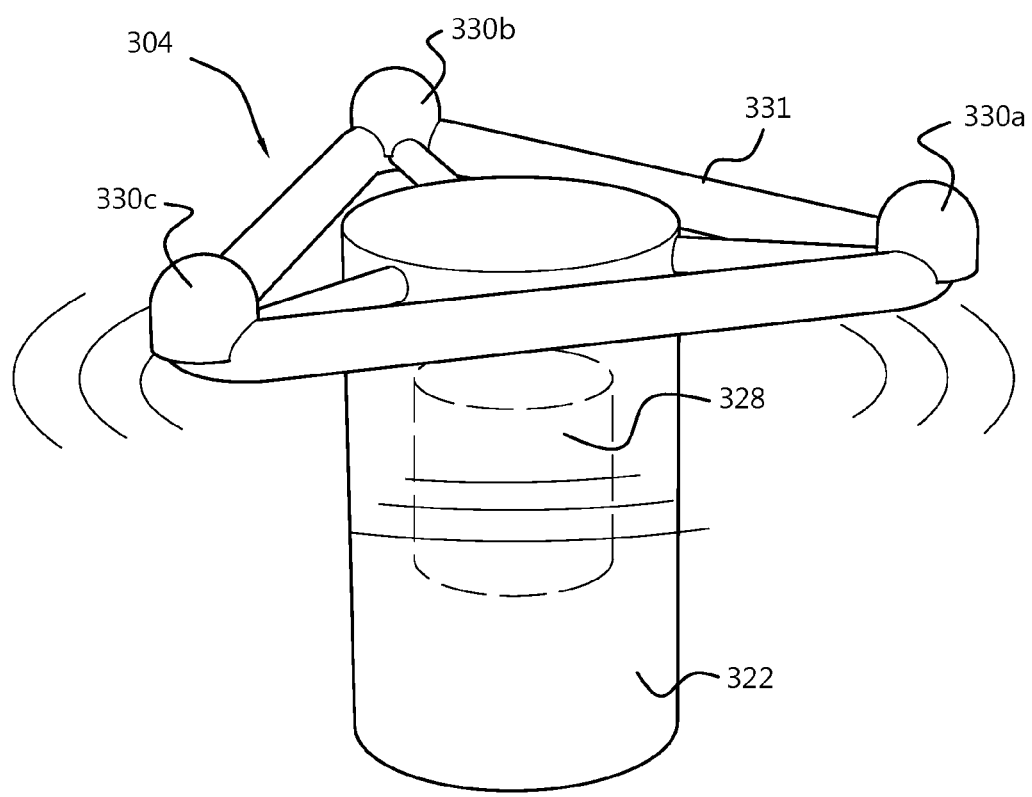
FIG. 8 shows a further embodiment of a beacon according to the invention.

FIG. 8 depicts a beacon 304 according to a third embodiment. Beacon 304 includes three light sources 330a, b, c located at three corners of a triangular frame 331 mounted on a base 322, including a transponder 328. The frame is isosceles in shape with the light sources 330b and 330c being closer together and light source 330A being relatively distant. The distances between the light sources 330a-c are carefully defined and can be used by an ROV to determine both scale and the direction in which the beacon 304 is pointed i.e. the location of light source 330a. It will be understood that the light sources 330a-c may also differ in color or be arranged to flash in different sequences should additional identification be required.

Figure 9:
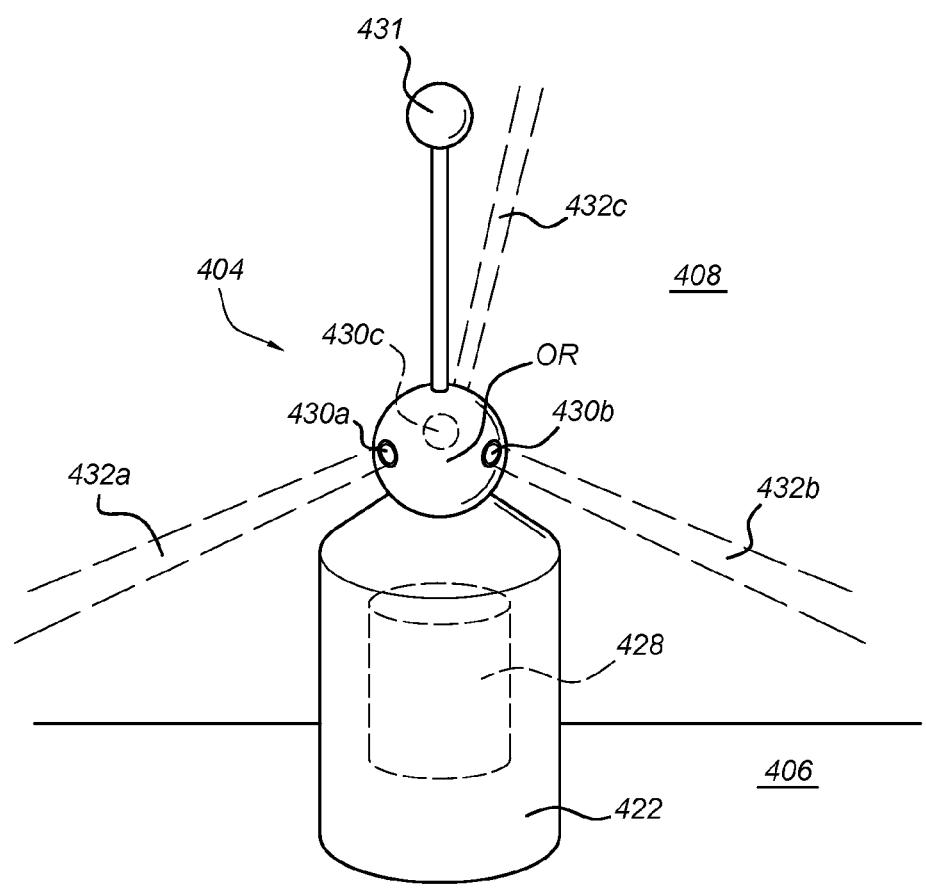
FIG. 9 shows yet another embodiment of a beacon.

FIG. 9 depicts a beacon 404 according to a fourth embodiment. The beacon 404 is showed in a deployed state on a seabed 406 of a body of seawater 408. The beacon 404 includes three light sources 430a, 430b, 430c, which are adjacently located at predetermined positions to define an origin OR of a local beacon reference frame. The three light sources 430a-c are mounted on a base 422, and are each adapted for projecting a respective beam of light 432a, 432b, 432c into the water 408, in a predetermined direction away from the origin OR of the local reference frame. These three light sources 430a-c may for example be formed by lasers. Subject to the turbidity of the water 408 and/or the concentration of particles floating in the water 408, the projected laser light will scatter to some extent, rendering portions of the three beams 432a-c visible for an imaging device that is sufficiently nearby.

The light sources 432a-c are arranged so that the directions of the projected light beams 432a-c do not coincide or propagate in a parallel fashion. Preferably, the directions of the projected light beams 432a-c are mutually orthogonal to define an orthogonal local reference frame. Orthogonality of the light beams, however, is not essential. If within an appropriate distance, a camera of an ROV may be able to observe all three light beams 432a-c.

Preferably, each of the three light sources 430a-c generates light of a different wavelength range. Alternatively or in addition, the three light sources 430a-c may be configured to flash in different time-patterns, to allow the processor in the rover to resolve the orientation of the projected (local) reference frame.

The projected light beam representation of the local reference frame may be used by the ROV to gather visual data relating to the local reference frame of the beacon 404. The visual data may for example be used to determine the direction in which the beacon 404 is pointed (including the location of the light sources 430a-c on the beacon 404, provided that the beacon's construction is already known by the ROV in advance).

An additional light source 431 may be provided on the beacon 404 at a predetermined distance from the light sources 430a-c. This additional light source 431 may for example be a point-like source fixed at a known distance and in a known direction from the origin OR of the local reference frame. Visual data of the additional light source 431 acquired by the imaging device on the ROV may be combined with advance knowledge of the arrangement of light sources 430a-c, 431 on the beacon, to assist in resolving for the scale of the beacon's local reference frame.

The beacon 404 further includes a transponder 428, with similar functionality as has been described herein above.

Figure 10:
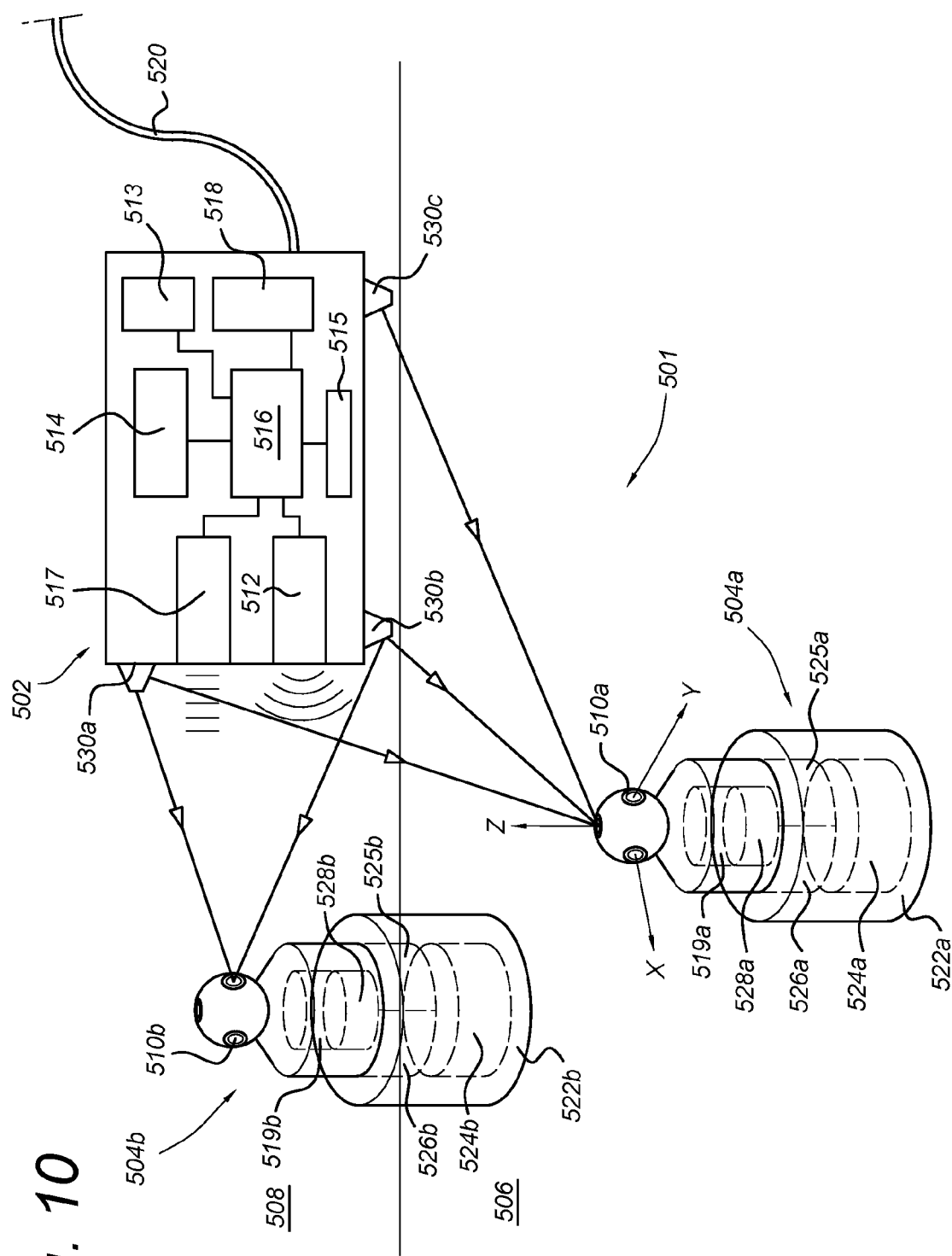
FIG. 10 shows an underwater positioning system according to another aspect of the invention.

FIG. 10 schematically illustrates an alternative implementation for an underwater positioning system 501. Features in the positioning system that have already been described above with reference to the embodiments in FIGS. 1-9 may also be present in the positioning system 501 shown in FIG. 10, and will not all be discussed here again. For the discussion with reference to FIG. 10, like features are designated with similar reference numerals preceded by 500, to distinguish the embodiments.

The positioning system 501 in FIG. 10 comprises an ROV 502 and at least one beacon 504 that is adapted for deployment in a body of water 508 at a fixed position. In this embodiment, the positioning system 501 comprises two beacons 504a, 504b. A reference frame XYZ is defined with respect to one of the two beacons 504, and this reference frame may be assumed to remain fixed with respect to the body of water 508.

The ROV 502 is also adapted for deployment in and moving through the body of water 508 between various positions and orientations with respect to the reference frame XYZ. In this alternative implementation, the positioning system 501 comprises several light sources 530a, 530b, 530c provided on the ROV 502 and moveable together with the ROV 502 between different positions/orientations with respect to the reference frame XYZ. The light sources 530a-c are positioned at predetermined locations on the outer hull of the ROV 502, to be visible for the imaging devices 510a, 510b from as many directions as the shape of the ROV hull allows. The spatial configuration of the light sources 530a-530c remains fixed with respect to the ROV 502. In this example, the light sources 530a-c are high power green/blue LEDs that provide a visibility of up to about 200 meters in clear water.

The ROV 502 further includes an orientation sensor 514, a processor 516, and a communications interface 518. At least one from an acoustic transceiver 512, an INS 513, and a depth sensor 515 may also be present. In addition, a laser line scanner 517 may be provided. The com interface 518 connects with an umbilical 520. The orientation sensor 514 is a pitch/roll/heading sensor, which may be a conventional solid state gravitational/magnetic sensor.

Each of the two beacons 504a, 504b is provided with an underwater imaging device 510a, 510b. Each underwater imaging device 510 is configured to observe the light sources 530a-c on the ROV 502, and to determine direction data representing a direction or change in direction of the light sources 530a-c with respect to the respective imaging device 510.

Each imaging device 510 may comprise several camera units that cooperate to provide an image extending over a portion of a spherical surface i.e. with a combined field of view extending over a substantial solid angle. The solid angle covered by the camera units may for example extend over $\Omega=2\pi$ steradian. Each of the two beacons 504 has a base 522, inside which are located a battery 524, an imaging device 510, an image processor 519, and electronics 526. The base 522 is relatively heavy, to keep the beacon 504 in a vertical orientation when deployed on the seabed 506. Above the base 22 is located an acoustic transponder 528 and the imaging device 510.

Operation of the positioning system 501 embodiment shown in FIG. 10 may proceed according to the same principles and procedures as discussed herein above with reference to FIGS. 2, 4 and 5, but adapted to account for the interchanged locations of the light sources 530a-c and imaging devices 510 on the ROV 502 and beacons 504 respectively.

Thus, embodiments of the invention have been described by reference to certain embodiments discussed above. From the above description, it should be understood that the underwater positioning system may be implemented either with one or more light sources provided on the ROV and one or more imaging devices provided on one or more beacons on the one hand, or with one or more imaging devices provided on the ROV and one or more light sources provided on one or more beacons on the other hand.

It will be recognized that these embodiments are susceptible to various modifications and alternative forms well known to those of skill in the art. In particular, beacons with any number of lights may be provided and the arrangement of the beacons and the implementation of the ROV may be distinct from the schematically illustrated design.

Many modifications in addition to those described above may be made to the structures and techniques described herein without departing from the spirit and scope of the invention. Accordingly, although specific embodiments have been described, these are examples only and are not limiting upon the scope of the invention.

Note that for reasons of conciseness, the reference numbers corresponding to similar elements in the various embodiments (e.g. beacons 104, 204, 304, etc. being similar to element 4) have been collectively indicated in the claims by their base numbers only i.e. without the multiples of hundreds. However, this does not suggest that the claim elements should be construed as referring only to features corresponding to base numbers. Although the similar reference numbers have been omitted in the claims, their applicability will be apparent from a comparison with the figures.

LIST OF REFERENCE SYMBOLS

Similar reference numbers that have been used in the description to indicate similar elements (but differing only in the hundreds) have been omitted from the list below, but should be considered implicitly included.
1 underwater positioning system
2 remotely operable vehicle
4 beacon
6 bed (e.g. sea bed)
8 body of water (e.g. seawater)
10 underwater imaging device (e.g. photogrammetric camera)
12 acoustic transceiver
14 orientation sensor
16 processor
18 communications interface
20 umbilical
22 base
24 battery
26 electronics
28 acoustic transponder
30 light source
109 light source matrix
111 second underwater imaging device (e.g. camera)
113 inertial navigation system
115 depth gauge
117 laser line scanner
125 beacon orientation sensor
126 beacon communication electronics
331 frame (e.g. triangle)
431 further light source
519 beacon image processor
AR ROV axis
AB beacon axis
Hi heading (object i=1, 2, ... )
N north
Oi underwater object (i=1, 2, ... )
Pi position (object i=1, 2, ... )
Rij range (from i to j)
αij bearing angle
Δk spatial offset (k=x, y, z)

The invention claimed is:

1. An underwater positioning system for providing position information for a rover, moveable within a reference frame, the system comprising:
at least one beacon having a light source, located at a fixed position within the reference frame;
an underwater imaging device, moveable with the rover in the reference frame to observe the light source from different viewpoints and determine direction data representing a direction or change in direction of the light source with respect to the imaging device;
an orientation sensor, associated with the imaging device to determine an orientation of the imaging device with respect to the reference frame and generate orientation data; and
a scaling element for providing scaling data representative of a distance between the imaging device and the light source.

2. The system according to claim 1, wherein the scaling element comprises an acoustic transponder located in or on the beacon at a predetermined fixed position relative to the light source and a corresponding acoustic transceiver associated with the imaging device.

3. The system according to claim 1, wherein the scaling element comprises the light source and at least one further light source mounted at a predetermined non-zero distance from the light source.

4. The system according to claim 1, wherein the scaling element comprises an Inertial Navigation System associated and moveable together with the imaging device and arranged to determine at least a distance between a first viewpoint and a second viewpoint.

5. The system according to claim 1, wherein the scaling element comprises a depth sensor associated and moveable together with the imaging device and arranged to determine a depth variation between a first viewpoint and a second viewpoint, or wherein the beacon comprises an orientation sensor arranged to determine at least a pitch and a roll of the beacon.

6. The system according to claim 5, wherein the orientation sensor of the beacon is arranged to also determine a heading of the beacon.

7. The system according to claim 1, wherein the scaling element comprises a second imaging device located at a fixed distance from the first imaging device, and wherein the system is configured to triangulate a distance to the light source.

8. The system according to claim 1, comprising a processor arranged to receive and analyze the direction data and the scaling data to determine the position information.

9. The system according to claim 1, comprising a laser striping device associated and movable together with the imaging device for generating a 3D profile of an object to be surveyed within the reference frame.

10. The system according to claim 1, further comprising: an underwater beacon comprising a base at a lower side and a light source at an upper side opposite to the lower side.

11. The system according to claim 10, wherein the underwater beacon further comprises one or more further light sources located at predetermined distances from the first light source and from each other.

12. The system according to claim 10, wherein the underwater beacon further comprises three light sources positioned to define an origin of the reference frame, wherein each of the three light sources is adapted for projecting a beam of light into a predetermined direction away from the origin, wherein the resulting beams generate a visual representation of three spatial axis of the reference frame, so as to be detectable by an imaging device on a rover.

13. A method of enhancing position information for a rover, moving within a reference frame underwater, the rover carrying an imaging device and being in communication with a processor for evaluating position data relating to the momentary position of the rover with respect to the reference frame, the method comprising:
providing a beacon having a light source;
placing the beacon at a fixed position within the reference frame;
moving the rover within the reference frame to different viewpoints;
generating direction data representing a direction of the light source with respect to the imaging device from the different viewpoints;
providing the direction data to the processor;
determining an orientation of the imaging device with respect to the reference frame and generate orientation data; and
providing scaling data representative of a distance between the light source and the imaging device.

14. The method according to claim 13, wherein providing scaling data representative of the distance between the light source and the imaging device comprises at least one of
providing an acoustic transponder on the beacon and interrogating the acoustic transponder from the rover to determine a distance to the beacon, and providing at least two light sources a known distance apart, and triangulating the distance to the imaging device.

15. The method according to claim 13, comprising locating a minimum of three beacons having light sources within the reference frame to form a matrix.

16. The method according to claim 13, wherein generating direction data comprises:
viewing the light source with the imaging device;
determining the co-ordinates of the center of the light source; and
transmitting the co-ordinates to the processing device without the transmission of further image data.

17. An underwater rover comprising an imaging device and an orientation sensor associated with the imaging device for determining an orientation of the imaging device with respect to a reference frame, the rover being controllable to:
move underwater within the reference frame to different viewpoints, relative to a beacon with a light source that is located at a fixed position within the reference frame;
generate direction data representing a direction of the light source with respect to the imaging device from the different viewpoints;
determine an orientation of the imaging device with respect to the reference frame and generate orientation data;
provide scaling data representative of a distance between the light source and the imaging device; and
communicate with a processor for evaluating position data relating to a momentary position of the rover with respect to the reference frame.

18. An underwater positioning system for providing position information for a rover, wherein the rover is adapted for deployment in a body of water and for moving within a reference frame, wherein the system comprises:
a light source provided in or on the rover and moveable together with the rover between different positions with respect to the reference frame;
a beacon provided with an underwater imaging device and adapted for deployment in the body of water at a fixed position with respect to the reference frame, wherein the underwater imaging device is configured to observe the light source at the different positions and to determine direction data representing a direction or change in direction of the light source with respect to the imaging device;
an orientation sensor, associated with the rover and configured to determine an orientation of the rover with respect to the reference frame and to generate orientation data, and
a scaling element for providing scaling data representative of a distance between the imaging device and the light source.

19. The system according to claim 18, wherein the scaling element comprises an acoustic transponder located in or on the beacon at a predetermined fixed position relative to the underwater imaging device, and a corresponding acoustic transceiver associated with the rover.

20. A method of enhancing position information for a rover, moving in a body of water and within a reference frame, wherein the rover is provided with a light source and is in communication with a processor for evaluating position data relating to the momentary position of the rover with respect to the reference frame, wherein the method comprises:
providing a beacon with an underwater imaging device, wherein the underwater imaging device is configured to observe the light source at different positions and to determine direction data representing a direction or change in direction of the light source with respect to the imaging device;
deploying the beacon in the body of water at a fixed position with respect to the reference frame;
moving the rover within the reference frame to different viewpoints;
generating direction data representing a direction of the light source with respect to the imaging device from the different viewpoints;
providing the direction data to the processor;
determining an orientation of the rover with respect to the reference frame to generate orientation data, and
providing scaling data representative of a distance between the imaging device and the light source.

21. The method according to claim 20, wherein providing scaling data representative of the distance between the imaging device and the light source comprises at least one of:
providing an acoustic transponder on the beacon and interrogating the acoustic transponder from the rover to determine a distance to the beacon, and
providing at least two light sources in or on the rover at a known distance apart, and triangulating the distance to the imaging device.

22. The method according to claim 20, wherein generating direction data comprises:
viewing the light source with the imaging device;
determining co-ordinates of the center of the light source; and
transmitting the co-ordinates to the processing device without transmitting further image data.

23. An underwater beacon adapted for deployment in a body of water at a fixed position with respect to a reference frame, the underwater beacon comprising a base at a lower side, and an underwater imaging device at an upper side opposite to the lower side, wherein the underwater imaging device is configured to observe a light source on a rover at different positions and to determine direction data representing a direction or change in direction of the light source with respect to the imaging device.

24. The underwater beacon according to claim 23, further comprising an acoustic transponder located at a predetermined position with respect to the imaging device.

* * * * *